June 7, 1927.
J. W. IVORY
1,631,819
NUT LOCK OR FASTENER WASHER
Filed Oct. 11, 1922  2 Sheets-Sheet 1
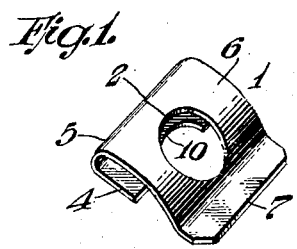
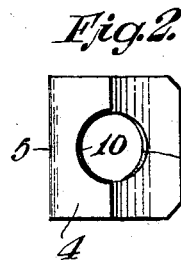
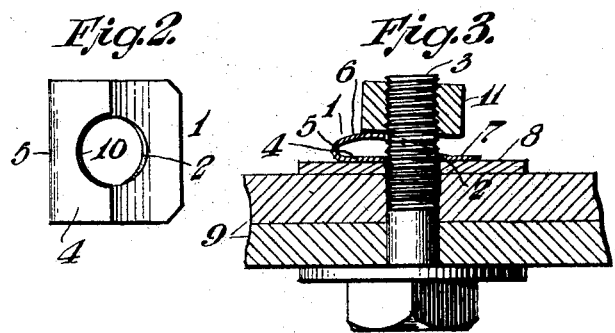
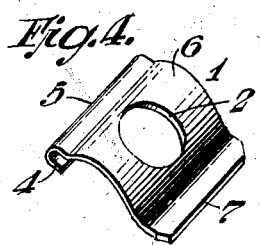
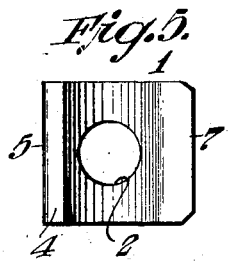
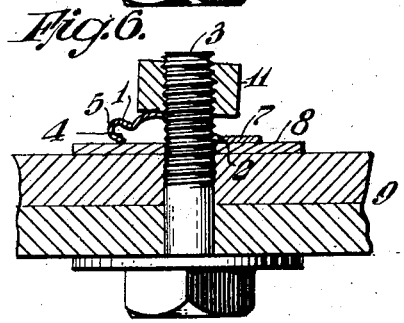
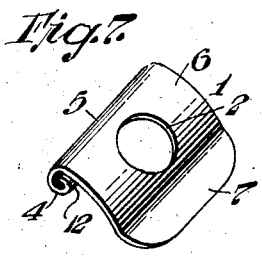
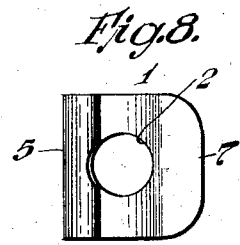
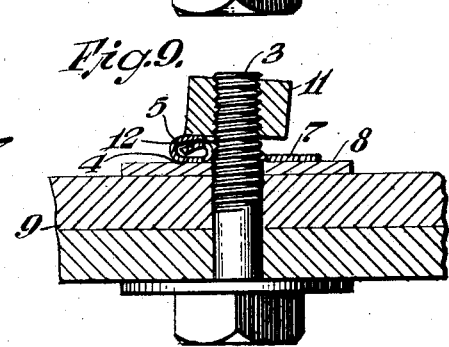
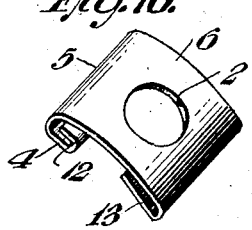
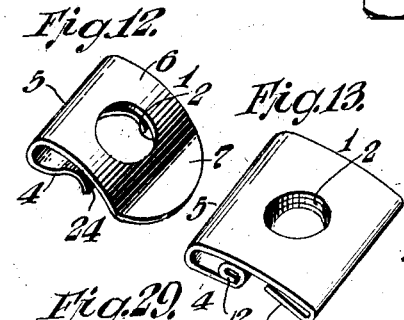
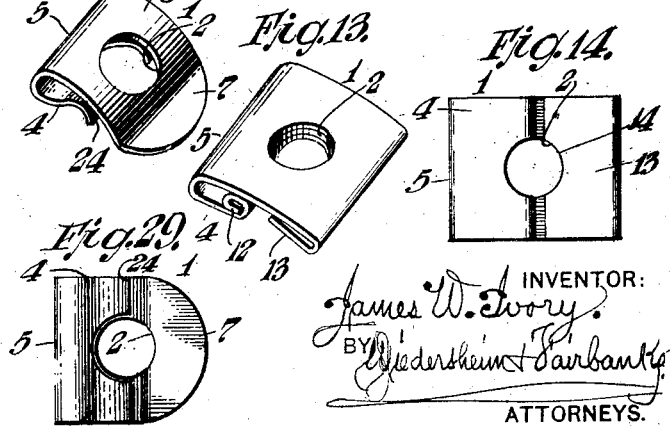
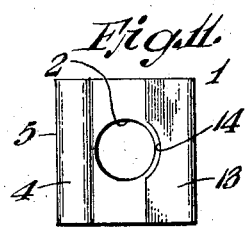
INVENTOR:
James W. Ivory
BY Wiedersheim & Fairbanks
ATTORNEYS.

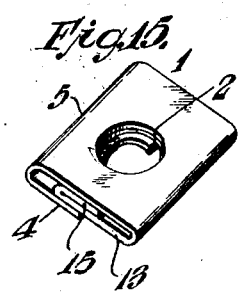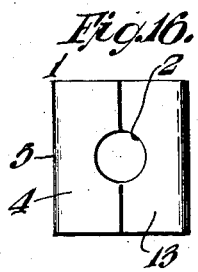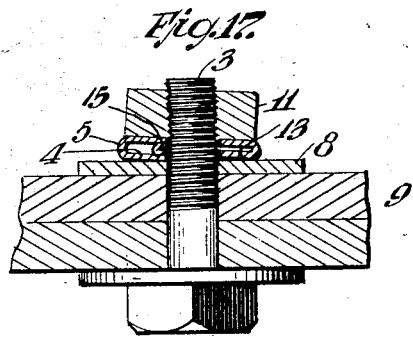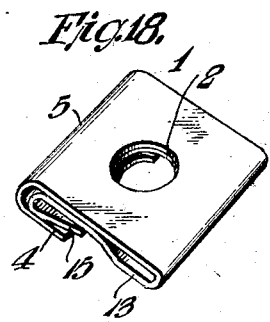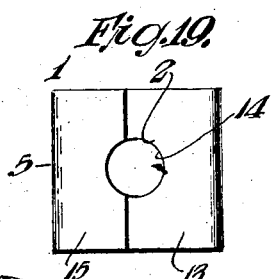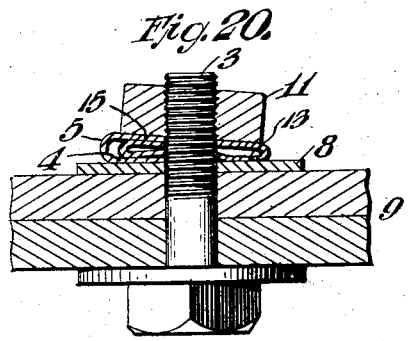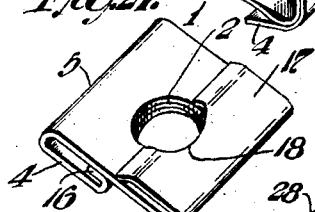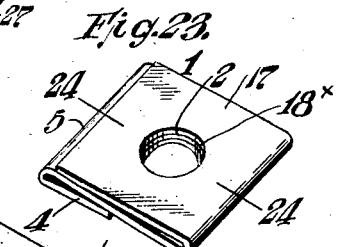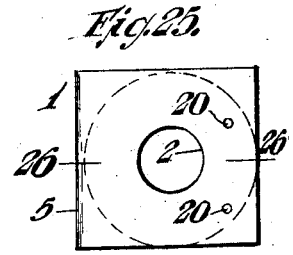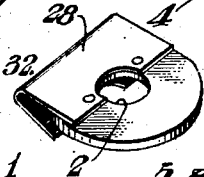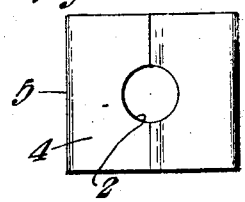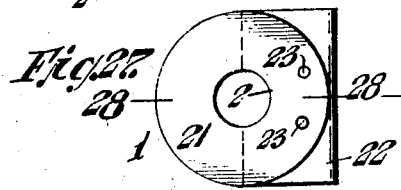

Patented June 7, 1927.

1,631,819

UNITED STATES PATENT OFFICE.

JAMES W. IVORY, OF PHILADELPHIA, PENNSYLVANIA.

NUT LOCK OR FASTENER WASHER.

Application filed October 11, 1922. Serial No. 593,676.

My invention consists of a nut lock or fastener washer formed of a folded body adapted to impart a spring or resilient tension between the nut and the surface where the clamping is occasioned and so tilting or obliquely setting the nut against the bolt with which it is engaged that the threads of the nut are jammed with those of the nut and thus preventing unscrewing of the nut and bolt.

The invention is satisfactorily illustrated in the accompanying drawing, but the important instrumentalities thereof may be varied, and so it is to be understood that the invention is not limited to the specific details shown and described, as long as they are within the spirit or scope of the claim.

Figure 1 represents a perspective view of a nut lock or fastener embodying my invention.

Figure 2 represents a bottom plan view thereof.

Figure 3 represents a diametrical section thereof showing also the application and operation of the device.

Figure 4 represents a perspective view of a modification of the invention.

Figure 5 represents a bottom plan view thereof.

Figure 6 represents a diametrical section thereof showing the application and operation of the device.

Figure 7 represents a perspective view of another modification.

Figure 8 represents a bottom plan view thereof.

Figure 9 represents a diametrical section thereof showing also the application and operation of the device.

Figure 10 represents a perspective view of another modification.

Figure 11 represents a bottom plan view thereof.

Figures 12, 13, 15, 18, 21 and 23 represent perspective views of other modifications.

Figure 14 represents a bottom plan view of Figure 13.

Figure 16 represents a bottom plan view of Figure 15.

Figure 17 represents a diametrical section of Figures 15 and 16 showing also the application and operation of the device.

Figure 19 represents a bottom plan view of Figure 18.

Figure 20 represents a diametrical section of Figures 18 and 19 showing also the application and operation of the device.

Figure 22 represents a bottom plan view of the modification of Figure 21.

Figure 24 represents a diametrical section of the device on line 24—24 Figure 23.

Figure 25 represents a top or plan view of another modification.

Figure 26 represents a diametrical section of the device on line 26—26 Figure 25.

Figure 27 represents a top or plan view of another modification.

Figure 28 represents a section thereof on line 28—28 Figure 27.

Figure 29 represents a bottom plan view of the embodiment shown in Figure 12.

Figure 30 represents a modification of the embodiment shown in Figure 26.

Figure 31 represents a perspective view of a modification showing the nut seated in the fastener or lock.

Fig. 32 is a modification of the structure disclosed in Fig. 27.

Similar numerals of reference indicate corresponding parts in the figures.

Referring to the drawings—

1 designates the nut lock or fastener washer embodying my invention, the same being formed of a plate of suitable metal having therein the opening 2 to receive the bolt 3 and the tongue 4, it being noticed that the plate is bent on itself on one side thereof to form said tongue which is resilient in its nature and extends from its bend 5 to a partial extent under the body of the plate and so does not extend under the side portion 6 of the plate opposite to said bend, it being noticed also that the plate is bowed so as to provide for resiliency and that the outer end of the portion 6 has thereon the lip 7 which with the tongue 4 comprises the base of the device, the same being adapted to rest upon the washer 8 which is placed on the member 9 to be bolted.

On the inner edge of the tongue 4 is the recess 10 which is in communication with the bolt-opening 2, the bolt passing through said recess. It will now be seen that when the lock or fastener is in position and the nut 11 applied to the bolt and rotated the bow of the lock or fastener is compressed downwardly or inwardly in oblique direction and it exerts upward pressure on one side of the nut, the tendency of which is to force the nut in an oblique direction against the bolt and cause it to jam laterally with the threads of the latter, thus preventing unscrewing of the nut and consequently of the bolt and so providing an efficient nut lock or fastening for the purpose.

In Figures 4, 5, and 6, the tongue 4 is shown foreshortened from that shown in Figures 1, 2, and 3.

In Figures 7, 8, and 9, the tongue is shown curled as at 12. In Figures 12 and 29 the tongue 4 has its inner end curved downward as at 24.

In Figures 10, 11, 13 and 14 the lip is shown inturned as at 13 said lip having on its inner end the recess 14 to allow the bolt to pass therethrough.

In Figures 15, 16, 17, 18, 19 and 20, the lip is shown doubly inturned as at 15 and adapted to enter the tongue 4.

In Figures 21 and 22 the tongue is shown doubly inturned as at 16, and the lip is shown inturned as at 17 over the top of the plate towards the bend 5. In Figure 21 the lip has therein the recess 18 to allow the bolt to pass therethrough. The lip in Figures 23 and 24 has therein the opening 18× to allow the bolt to pass therethrough.

In Figures 25 and 26, a washer 19 is interposed between the top plate of the lock or fastener and the tongue 4 and riveted to said plate as at 20, the same serving as a reinforce for the device.

In Figures 27 and 28, the device is shown as an annular plate 21 on whose underside portion is the folded tongue 22 riveted thereto as at 23. This raises said portion and imparts an oblique direction to the plate.

In Figure 30 the tongue 4 has its inner end curved downwardly as at 25.

In Figure 31 the sides of the body of the fastener or lock are turned up as at 26 so that the nut is seated between the same, and one of the sides is continued downwardly by the fold 27 on the exterior thereof from the top to the bottom thereof and its lower end is bent inwardly forming the tongue 4.

In Figure 32 the tongue 28 is laterally angular and formed of a piece of resilient metal or other suitable material one limb of which is on the upper face of the washer plate and riveted thereto. The other limb is below the under face of said washer plate and is set out therefrom thus providing resiliency for said lower limb and giving to one side of the washer plate a greater thickness to said plate than on the other side, both limbs of the piece terminating about midway of the bolt opening. It will be noticed that the spring tongue or lip 4, is in each figure braced or supported by its contact with component parts of the washer.

The riveting of the plate to the washer, as in Figures 25, 26, and 30 is interposed in this application as a modification in place of the folded spring or tongue or lip 4; which I show in the other figures; the riveting serving in place of a fold in the metal.

I have found that the best forms are those that have the spring tongue or lip 4 terminating about midway of the bolt aperture hollowed out to accommodate the bolt, giving to that side of the washer an excess of metal, of one or two thicknesses, giving a leaf or more of metal to one half of the washer so that when the nut is screwed to the bolt will under pressure properly exerted, cause the nut to lean or incline towards the thinner side of the washer plate, forcing the thread of the nut to wedge into the thread of the bolt. This together with the spring tongue or lip or leaf of metal on this thicker side of the washer causes a very unyielding nut lock to any vibratory action on a vehicle or other mechanism. The whole idea is to give that tension to the thread and forced wedging of the thread of the nut with the thread of the bolt, that the nut will not by any form of vibration loosen from the thread of the bolt and will yield only to the superior force of a wrench or other implement or power or when the nut is desired to be removed. It will be evident that this spring lip or tongue of metal will open to its original position when force is removed.

Having thus described my invention what I claim as new and desire to secure by Letters Patent, is:—

In combination two members arranged to be rigidly bolted together, a cylindrical bolt, the major portion of which is screwthreaded and which screw-threads extend entirely through said members, a washer fitted over the screw-threaded portion of said bolt, a nut-lock comprising a plate having a central circular hole for insertion over the extended screw-threaded portion of said bolt, said plate having one end bent downwardly thereunder to provide a hollow, rib-like and laterally extended, resilient portion for resting upon the top of said washer, the opposite end of said plate being flat for free abutment upon said washer, and a nut for said bolt one lower edge of which nut abuts upon said rib-like, deflected, lateral, resilient portion of said plate, and the opposite lower edge of the nut being entirely free of both the plate and washer.

JAMES W. IVORY.